(12) United States Patent
Byrne

(10) Patent No.: US 12,074,768 B1
(45) Date of Patent: Aug. 27, 2024

(54) DYNAMIC CONFIGURATION OF CONSENSUS-BASED NETWORK

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 532 days.

(21) Appl. No.: 17/471,056

(22) Filed: Sep. 9, 2021

(51) Int. Cl.
- *H04L 41/12* (2022.01)
- *H04L 43/08* (2022.01)
- *H04L 45/02* (2022.01)

(52) U.S. Cl.
CPC ............. *H04L 41/12* (2013.01); *H04L 43/08* (2013.01); *H04L 45/02* (2013.01)

(58) Field of Classification Search
CPC ..... H04W 40/34; H04W 88/04; H04W 88/06; H04W 88/16; H04L 45/245; H04L 45/28; H04L 41/12; H04L 43/08; H04L 45/02
See application file for complete search history.

(56) References Cited

U.S. PATENT DOCUMENTS

| | | | |
|---|---|---|---|
| 7,720,959 | B2 | 5/2010 | Karam et al. |
| 7,796,524 | B1 | 9/2010 | Oconnell et al. |
| 7,852,784 | B2 | 12/2010 | Leung et al. |
| 7,954,010 | B2 | 5/2011 | Beattie, Jr. et al. |
| 7,974,212 | B2 | 7/2011 | Leung et al. |
| 8,180,735 | B2 | 5/2012 | Ansari et al. |
| 8,189,489 | B2 | 5/2012 | Zhang et al. |
| 8,295,191 | B2 | 10/2012 | Leung et al. |
| 8,472,944 | B2 | 6/2013 | Shah et al. |
| 8,997,000 | B2 | 3/2015 | Ebtekar et al. |
| 9,015,306 | B2 | 4/2015 | Dupre et al. |
| 9,559,900 | B1 | 1/2017 | Morley et al. |
| 9,578,511 | B2 | 2/2017 | Kashef et al. |
| 9,654,937 | B2 | 5/2017 | Addepalli et al. |
| 9,672,503 | B2 | 6/2017 | Furr et al. |
| 9,674,042 | B2 | 6/2017 | Lissack |
| 9,942,787 | B1 | 4/2018 | Tillotson |
| 9,954,791 | B2 | 4/2018 | Sreeramoju |
| 10,244,003 | B2 | 3/2019 | Gunnalan et al. |
| 10,320,644 | B1 | 6/2019 | Chen et al. |
| 10,348,639 | B2 | 7/2019 | Puchala et al. |

(Continued)

FOREIGN PATENT DOCUMENTS

| | | |
|---|---|---|
| CN | 109845227 B | 5/2020 |
| DE | 102020113808 A1 | 11/2020 |

(Continued)

*Primary Examiner* — Awet Haile
(74) *Attorney, Agent, or Firm* — Perkins Coie LLP

(57) ABSTRACT

The disclosed technique includes establishing consensus among devices to share performance metrics data of those devices. An example of the devices includes endpoint devices that are owned or managed by a common entity. The devices form a consensus-based network. The devices are each operable to independently connect to an external network. A manager device of the devices dynamically selects which of the devices will operate like a network access device to route traffic between the devices and the external network. The network access device is selected by the manager device based on the performance metrics data to optimize a global performance metric of the consensus-based network.

20 Claims, 4 Drawing Sheets

(56) References Cited

U.S. PATENT DOCUMENTS

| | | |
|---|---|---|
| 10,587,488 B2 | 3/2020 | Ramanarayanan et al. |
| 10,681,593 B2 | 6/2020 | Shaw et al. |
| 10,791,146 B2 | 9/2020 | Xie et al. |
| 10,798,560 B2 | 10/2020 | Chennupati et al. |
| 10,805,104 B2 | 10/2020 | Chen et al. |
| 10,827,019 B2 | 11/2020 | Rubin et al. |
| 10,855,596 B2 | 12/2020 | Thiagarajan et al. |
| 10,862,777 B2 | 12/2020 | Richards et al. |
| 10,904,824 B2 | 1/2021 | Robb et al. |
| 10,911,263 B2 | 2/2021 | Richards et al. |
| 10,917,324 B2 | 2/2021 | Richards et al. |
| 10,999,189 B2 | 5/2021 | Musku et al. |
| 11,044,773 B2 | 6/2021 | Shaw et al. |
| 11,218,313 B1* | 1/2022 | Raghavan ............. H04L 9/0643 |
| 2005/0213768 A1 | 9/2005 | Durham et al. |
| 2007/0153813 A1 | 7/2007 | Terpstra et al. |
| 2008/0072292 A1 | 3/2008 | Narjala |
| 2012/0140745 A1* | 6/2012 | Jeon ...................... H04W 8/005 |
| | | 370/336 |
| 2012/0155352 A1* | 6/2012 | Jeong ................ H04W 52/0209 |
| | | 370/311 |
| 2013/0111038 A1 | 5/2013 | Girard |
| 2016/0262192 A1* | 9/2016 | Sievers ................. H04W 40/34 |
| 2018/0204129 A1 | 7/2018 | Vasseur et al. |
| 2019/0356530 A1 | 11/2019 | Berg et al. |
| 2019/0387403 A1 | 12/2019 | Chennupati et al. |
| 2020/0267114 A1 | 8/2020 | Ramamurthy et al. |
| 2022/0021585 A1* | 1/2022 | Barton ................. H04L 41/0668 |
| 2022/0200985 A1* | 6/2022 | Simon ................. H04L 63/0876 |
| 2023/0239294 A1* | 7/2023 | Lin ....................... H04L 63/083 |
| | | 726/4 |

FOREIGN PATENT DOCUMENTS

| | | |
|---|---|---|
| DE | 202017007362 U1 | 12/2020 |
| DE | 102020117210 A1 | 1/2021 |
| DE | 102020118312 A1 | 2/2021 |
| EP | 1751923 B1 | 5/2017 |
| EP | 3520330 A1 | 8/2019 |
| EP | 3066569 B1 | 5/2021 |
| EP | 3391628 B1 | 8/2021 |
| KR | 102152116 B1 | 9/2020 |
| WO | 2012170005 A1 | 12/2012 |
| WO | 2016003885 A1 | 1/2016 |
| WO | 2018004600 A1 | 1/2018 |
| WO | 2018116123 A1 | 6/2018 |
| WO | 2018217326 A1 | 11/2018 |
| WO | 2019195502 A1 | 10/2019 |
| WO | 2020229274 A1 | 11/2020 |
| WO | 2021062116 A1 | 4/2021 |

\* cited by examiner

DYNAMIC CONFIGURATION OF CONSENSUS-BASED NETWORK

BACKGROUND

A computer network is a group of computers or electronic devices that use a set of common communication protocols over digital interconnections for the purpose of sharing resources located on or provided by the network's nodes. The nodes can include personal computers, servers, networking hardware, or other specialized or general-purpose hosts.

There are many different types of computer networks; one common classification is by physical extent or geographic scale. For example, a local area network (LAN) is a computer network for interconnecting computers within a limited area such as a residence, school, laboratory, university campus, or office building. A personal area network (PAN) is a computer network for interconnecting electronic devices within an individual person's workspace. A PAN provides data transmission among devices such as computers, smartphones, tablets, and personal digital assistants. PANs can be used for communication among the personal devices themselves, or for connecting to a higher-level network and the Internet. LANs/PANs may be wireless by utilizing technologies such as Bluetooth, Li-Fi, or Wireless USB, or they may be carried over wired interfaces such as Ethernet or USB.

In the era of Internet of Things (IoT) and Internet of Everything (IoE), it is customary for all of the devices in a LAN/PAN to need Internet and/or Global Positioning System (GPS) access. In particular, IoT refers to a network of physical objects that are embedded with sensors, software, and other technologies for the purpose of connecting and exchanging data with other devices and systems over the Internet. IoE expands this paradigm to encompass not just physical objects but also people, data, and processes.

BRIEF DESCRIPTION OF THE DRAWINGS

Detailed descriptions of implementations of the present invention will be described and explained through the use of the accompanying drawings.

Figure 1:
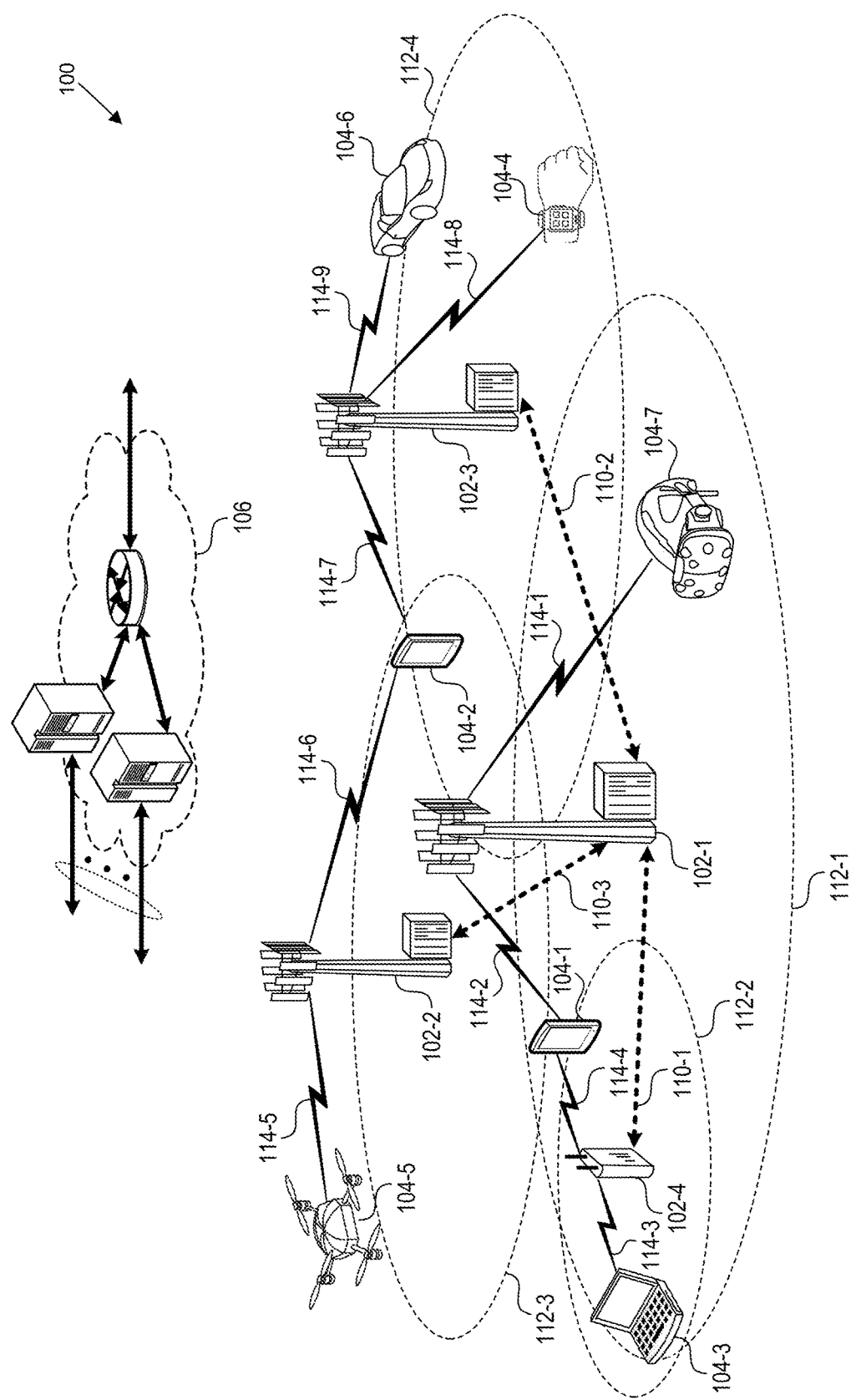
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed solution can counter uneven performance and utilization across electronic devices by utilizing resource-sharing capabilities of a network in which the devices are situated. Often, the multiple endpoint devices that are owned or managed by a single individual or enterprise are each capable of independently connecting to the Internet through one or more networks. For example, a smartphone can access the Internet through a telecommunications network of the user's mobile-carrier plan or a Wi-Fi connection, a laptop or desktop computer can access the Internet through an Ethernet or Wi-Fi connection to a broadband home router, and a car's infotainment system can access the Internet as part of the service provided by the car's dealership or manufacturing company.

Major drawbacks that plague users of such wireless Internet-connected devices include limited battery life and the quality or reliability of the Internet connection. Specifically, in a networked environment, the battery life, power consumption, Internet-connection performance (in terms of, e.g., speed, stability, bandwidth), and Internet-connection cost can differ across different endpoint devices of the network. Moreover, for any given device, these performance metrics can change over time depending on circumstances. For example, a driver carrying a smartphone may find the Internet-connection performance of the smartphone and of the car's infotainment system vary in different ways as the car is driven to different locations.

The disclosed technology can utilize high performing devices and compensate for poor performing devices. In one example, the network can (1) communicate information about each device's performance metrics, and (2) serve as a resource-sharing medium. To accomplish this, one device in the network can serve as a centralized hub (also referred to herein as a "broker" or "manager" device), to which metrics data of the other devices in the network is sent. The broker can then evaluate the metrics data including each device's communications connectivity (in terms of, e.g., speed, stability, bandwidth), Internet-access cost, remaining battery life, power consumption, and other relevant metrics. Through this evaluation, the manager device can decide, based on a sorting algorithm that optimizes a particular global performance metric, which device to serve as the network access link to a higher-level network such as a Wide Area Network (WAN) (e.g., Internet) for the endpoint devices on the lower-level network.

The endpoint devices that are not chosen by the manager device to serve as the network access device are configured as "child" devices can access the Internet through the network access device via the network's interconnectivity. As such, Internet traffic of all of endpoint devices can be routed through a single device. In so doing, the network can-depending on how the global performance metric is configured-minimize the total cost per unit time, minimize the total power consumption, maximize the performance of the Internet connection for all the devices, maximize the amount of time for which the endpoint devices can remain connected to the Internet, etc.

As such, the disclosed technology enhances communications for a person, business, or an enterprise that owns or manages multiple computers and electronic devices, all operating simultaneously within close physical proximity of each other. These devices often constitute part of a local area network (LAN) or personal area network (PAN). For example, a person working from home may have a smartphone, augmented-reality goggles, a laptop computer, a desktop computer, and a vehicle (parked in a nearby garage) equipped with a computer (e.g., an infotainment system, perhaps capable of connecting to a smartphone). Or, endpoint devices, as well as other computing equipment, at a company's office or on a school's campus may all be connected to the same virtual private network (VPN). The network's connections can be either wired (through, e.g., Ethernet, USB) or wireless (through, e.g., Bluetooth, Li-Fi, Wireless USB).

By providing a medium through which constituent devices can communicate, such a network also enables sharing of information-based resources, such as Internet or Global Positioning System (GPS) access. Therefore, by jointly evaluating the performance of the endpoint devices on a network, it becomes possible to optimize usage of a particular resource across all the endpoint devices. Specific problem settings in which this is useful, as well as concrete examples of how this can be done in practice, are described below.

There are no inherent restrictions on which endpoint devices can serve as the manager device or the network access device. Furthermore, both the choice of the manager device and the choice of the network access device can change during operation/usage-indeed, a feature of the disclosed technology includes dynamic reconfigurability. Also, in many scenarios, it can be advantageous and/or optimal for the same endpoint device to serve as both the manager device or the network access device. However, this need not be the case in all circumstances.

A network edge device such as a home Wi-Fi router can be the selected network access device through which network traffic is directed. For example, in a normal state of operation, a home Wi-Fi router is the best network access device—as it is inexpensive, fast, and is plugged into an infinite power source. However, if there is a power failure at home, a smartphone can become the optimal connection for all the endpoint devices that have a common attribute. Examples of the common attribute include a common network, a common user or users, or being registered to a common entity. Later, as the smartphone's battery drains, a car's access to a telecommunications network can become the best option for maintaining optimal performance of associated endpoint devices.

In an example that involves a vehicle (e.g., car, boat, scooter), the Internet coverage can change differently between a driver's smartphone and the vehicle's computer system. As such, the smartphone, assuming it serves as the manager device, can alternately choose between itself and the vehicle as the network access device while driving. What these examples demonstrate is how the network adapts to an evolving environment by dynamically choosing different devices to serve as the manager device and network access device to link the endpoint device to the Internet. In so doing, the network devices collectively utilize an opportunistic set of Internet connections over time.

In some examples, the described technology is conceptualized as being network-centric, as opposed to user- or location-centric. Another important aspect of the network-centric approach to resource optimization is security: For example, all devices in the same network should trust—or, more precisely, have a consensus that they are willing to share information with—each other. In public spaces, for example, the system would have to be able to distinguish its own network from other networks.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless WAN (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (ARNR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Dynamic Configuration of Consensus-Based Network

Figure 2:
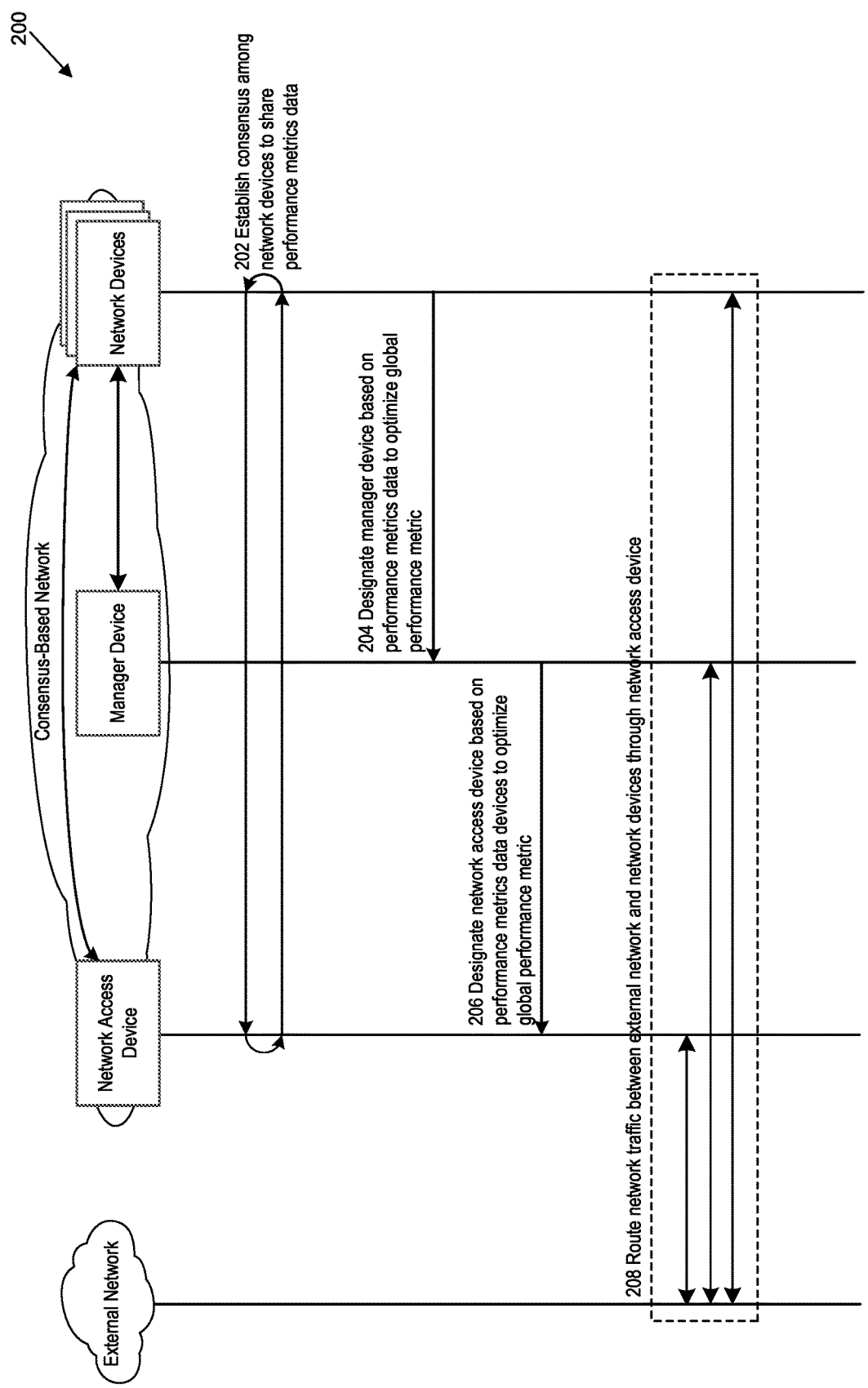
FIG. 2 is a flow diagram that illustrates dynamic configuration of a consensus-based network.

FIG. 2 is a flow diagram that illustrates dynamic configuration of a consensus-based network. The processes 200 are performed by a system that includes network devices such as endpoint devices and edge devices. An endpoint device can include a computing device that communicates back and forth with a network to which it is connected. Examples of endpoint devices include a personal computer (e.g., desktop, laptop), smart device (e.g., smartphone, smart watch), tablet, server, workstation, IoT device, and the like. An edge device can provide traffic egress or ingress for a network. Examples include routers, integrated access devices (IADs), multiplexers, and a variety of metropolitan area network (MAN) and WAN access devices.

At 202, consensus is established among the network devices to share their performance metrics data. The network devices thereby form a consensus-based network. A network device is typically operable to independently connect to one or more external networks (e.g., a WAN). For example, the network devices of the consensus-based network can each access the Internet through an access point (e.g., edge device). Examples of performance metrics data include data indicative of remaining battery power of a network device, power consumption by a network device, performance of a connection between a network device and the external network, charges for an network device to access the external network, and/or remaining data available on a data plan for a network device.

Establishing consensus can require authenticating each of the network devices based on having a common owner, a common managing entity (e.g. user, group of users, enterprise), or a common service plan (e.g., to access a telecommunications network). To enable establishing consensus among the network devices, each network device can include a software agent that is configured to perform the authentication and enable dynamic designation of selected network devices for specific roles based on the performance metrics data. Unauthorized network devices are precluded from joining the consensus-based network or sharing performance metrics data with the authorized network devices. Thus, for example, consensus can be established among only a subset of network devices.

At 204, the system designates a network device (e.g., an endpoint device) as a manager device for the consensus-based network. The manager device can be selected based on performance metrics data and/or by consensus among the network devices. The performance metrics data can indicate, for example, an availability of power sources (e.g., battery life) or processing resources to manage the consensus-based network. In addition to power sources and processing resources, performance metrics data can indicate connectivity performance (e.g., speed, steady, bandwidth) of a network device. For example, based on performance data, the system can designate a smartphone or laptop computer to manage the consensus-based network. The smartphone can be selected as the manager device at night when the smartphone is charging, and the laptop can be selected as the manager device during the day when the smartphone draws more power from its battery.

The manager device can be selected to optimize a global performance metric of the consensus-based network. Examples of optimizing the global performance metric include reducing total charges (e.g., cost) for utilizing service plans of the network devices, managing power consumption to avoid depleting power of the network devices, or improve performance of network connectivity, increase an amount of time that the network devices can remain connected to the external network. The manager device can obtain performance metrics data in an ongoing manner (e.g., continuously, periodically, on demand) over one or more communications channels of the consensus-based network.

At 206, the system selects a network device as the network access device for the consensus-based network. The network device is selected from among the network devices of the consensus-based network based on, for example, the performance metrics data to optimize the global performance metric of the consensus-based network. In another example, the system can jointly evaluate performance of network devices to optimize usage of a particular resource across all network devices, where the resource can include connectivity, power, or data plan resources. The manager device can designate the network access device through which network traffic (e.g., Internet traffic) is communicated between the consensus-based network and the external network. In particular, the manager device can execute a sorting algorithm to process the performance metrics data and use the output to decide which of the network devices, when designated as the network access device, would optimize the global performance metric.

The manager device and the network access device can be different devices or the same device. For example, the manager device or the network access device can be the same smart device (e.g., smartphone, smart watch) or one is a smart device and the other is a vehicle infotainment system or a personal computer. In one example, the smart device can connect to the external network over cellular, Wi-Fi network, and Bluetooth, whereas the personal computer can connect to the second network over Wi-Fi, and whereas the vehicle infotainment system can connect to the external network over cellular and Wi-Fi.

At 208, the system routes network traffic between the network devices and the external network through the network device designated as the network access device. As such, any endpoint devices of the consensus-based network can operate as the sole point of egress and ingress of network traffic between the consensus-based network and the external network. The system can dynamically change the manager device and/or the network access device to other network devices based on additional performance metrics data. As such, optimal performance of the consensus-based network is continuously maintained by changing network devices to manage the consensus-based network and/or to route network traffic between the network devices and the external network.

Figure 3:
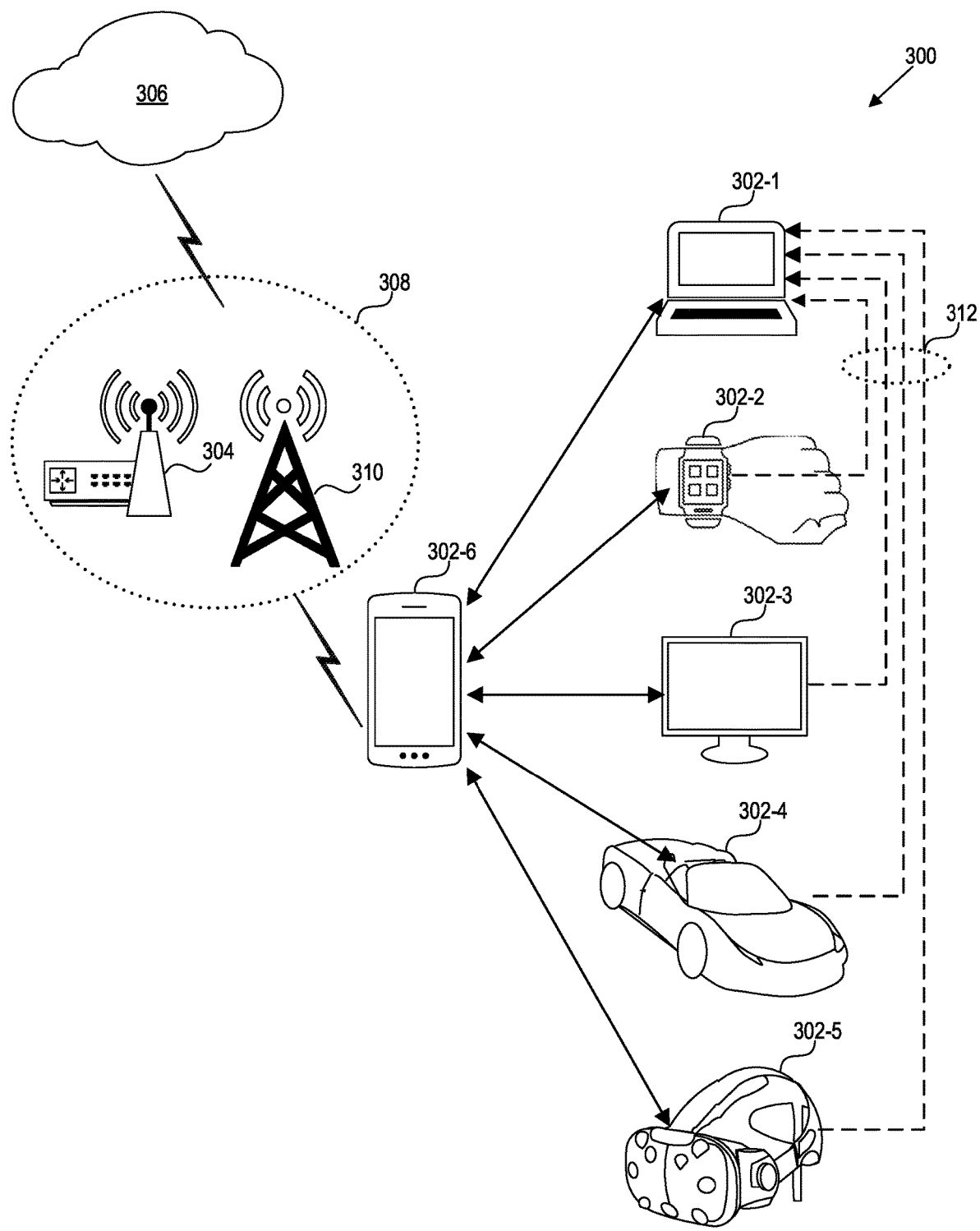
FIG. 3 is a block diagram that illustrates an example of a consensus-based network.

FIG. 3 is a block diagram that illustrates an example of a consensus-based network. As shown, a network 300 includes multiple interconnected network devices. The network devices include endpoint devices 302-1 through 302-6 (collectively referred to as "endpoint devices 302"). As shown, the endpoint devices 302 include laptop 302-1, smartwatch 302-3, IoT device 302-3, vehicle computer 302-4, AR goggles 302-5, and smartphone 302-6. The network devices also include an edge device (e.g., a Wi-Fi router 304). The endpoint devices 302 can access the external network 306 (e.g., Internet) independently through different types of access devices 308. For example, at least some endpoint devices 302 can access the external network 306 through the Wi-Fi router 304 and/or as a cell tower 310.

Consensus is established across the endpoint devices 302 to thereby form a consensus-based network configured to share performance metrics data. The performance metrics data can indicate power consumption, connectivity performance, resource utilization, etc. As shown, the laptop 302-1 is designated as the manager device and, as such, analyzes performance metrics data obtained over communication channels 312 of the consensus-based network.

The laptop 302-1 can dynamically select a network access device for the consensus-based network through which network traffic is communicated between the endpoint devices 302 and the external network 306. As shown, the smartphone 302-6 is designated as the network access device based on the performance metrics data to optimize a global performance metric of the consensus-based network. As a result, network traffic between the endpoint devices 302 and the external network 306 can be routed only through the smartphone 302-6.

Thus, the network 300 can change to use any of the smartwatch 302-3, the IoT device 302-3, the vehicle computer 302-4, or the AR goggles 302-5 to route network traffic between the endpoint devices 302 and the external network 306 when, for example, the performance metrics data indicate that the battery life of the smartphone 302-6 has dropped below an acceptable threshold amount. The manager device can also be changed to a device other than the laptop 302-1 if doing so would optimize the consensus-based network for a global performance metric. As such, optimal performance of the consensus-based network is continuously maintained by changing to different network devices for managing the consensus-based network or through which network traffic is communicated with the external network 306.

Computer System

Figure 4:
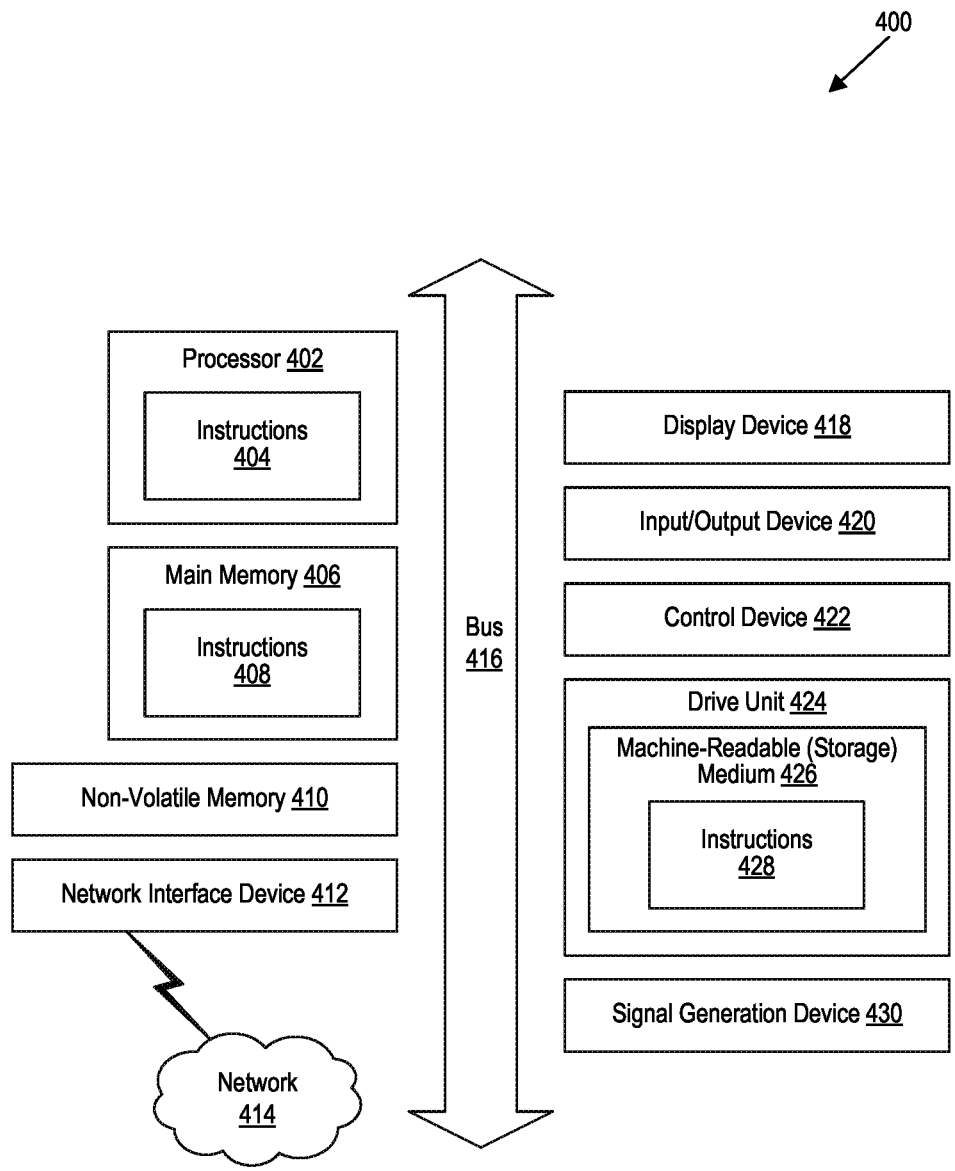
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:
   establish consensus among multiple network devices to form a consensus-based network configured to share performance metrics data among the multiple network devices,
      wherein the multiple network devices include multiple endpoint devices, and
      wherein the multiple network devices are each operable to independently connect to one or more external networks, each being external to the consensus-based network;
   obtain the performance metrics data of the multiple network devices over the consensus-based network,
      wherein the performance metrics data are indicative of power consumption, connectivity performance, or processing resource utilization of the multiple network devices;
   select a particular endpoint device of the multiple network devices as a manager device,
      wherein the particular endpoint device is selected from among the multiple network devices based on the performance metrics data; and
      wherein the manager device is configured to select a network access device through which network traffic is communicated between the consensus-based network and the one or more external networks;
   select a particular network device from among the multiple network devices as the network access device,
      wherein the particular network device is selected from among the multiple network devices based on the performance metrics data to optimize a global performance metric of the consensus-based network, and
      wherein the global performance metric includes utilization of one or more service plans, power consumption of available power sources, or performance of network connectivity; and
   route network traffic between the multiple network devices and the one or more external networks through the particular network device.

2. The computer-readable storage medium of claim 1, wherein to establish consensus among the multiple network devices comprises causing the system to:
   authenticate the multiple network devices based on a common owner, a common managing entity, or a common service plan,
      wherein each of the multiple network devices includes a software agent configured to perform the authentication and enable dynamic selection of the manager device and the network access device from among the multiple network devices based on the performance metrics data.

3. The computer-readable storage medium of claim 1, wherein the particular network device is a first network device, and wherein the system is further caused to:
   change the network access device to a second network device of the multiple network devices based on additional performance metrics data; and
   route network traffic between the multiple network devices and the second network through the second network device instead of the first network device.

4. A system comprising:
   at least one hardware processor; and
   at least one non-transitory memory storing instructions, which, when executed by the at least one hardware processor, cause the system to:
      interconnect multiple endpoint devices on a first network, wherein consensus is established among the multiple endpoint devices to share performance metrics data among the multiple endpoint device devices, and wherein each of the multiple endpoint devices is operable to independently connect to a second network different from the first network;

select a first endpoint device of the multiple endpoint devices as a manager device, wherein the manager device is configured to select a network access device through which network traffic is communicated between the multiple network devices and second network;

cause the manager device to process the performance metrics data of the multiple endpoint devices, wherein the performance metrics data is collected at the manager device over a communications channel of the first network;

select, based on the performance metrics data, a second endpoint device of the multiple endpoint devices as the network access device, wherein the network access device is configured to communicate network traffic between the multiple endpoint devices and the second network; and route network traffic between the multiple endpoint devices and the second network through the second endpoint device.

5. The system of claim 4 being further caused to:
change the network access device to a third endpoint device of the multiple endpoint devices base on additional performance metrics data; and
route network traffic between the multiple endpoint devices and the second network through the third endpoint device instead of the second endpoint device.

6. The system of claim 4 being further caused to, prior to the manager device being selected:
establish consensus among only a subset of multiple network devices corresponding to the multiple endpoint devices to share the performance metrics data among the multiple endpoint devices, and
wherein any unauthorized endpoint device is precluded from joining the first network and sharing the performance metrics data.

7. The system of claim 4 being further caused to:
change the manager device to a third endpoint device of the multiple endpoint devices; and
cause the third endpoint device to select a different network access device based on additional performance metrics data.

8. The system of claim 4:
wherein the first endpoint device is different from the second endpoint device,
wherein the first endpoint device or the second endpoint device is a handheld mobile device, and
wherein the network traffic includes Internet traffic.

9. The system of claim 4:
wherein the second endpoint device of the multiple endpoint devices is the same as the first endpoint device,
wherein the first endpoint device or the second endpoint device is a handheld mobile device, and
wherein the network traffic includes Internet traffic.

10. The system of claim 4, wherein to interconnect the multiple endpoint devices comprises causing the system to:
authenticate the multiple endpoint devices based on a common owner, a common managing entity, or a common service plan, wherein each of the multiple endpoint devices includes a software agent configured to perform the authentication and enable dynamic selection of the manager device and the network access device from among the multiple endpoint devices based on the performance metrics data.

11. The system of claim 4, wherein the multiple endpoint devices comprise at least two of:
a smart device configured to connect to the second network over cellular, Wi-Fi network, and Bluetooth,
a personal computer configured to connect to the second network over Wi-Fi, or
a vehicle infotainment system configured to connect to the second network over cellular and Wi-Fi.

12. The system of claim 4, wherein the performance metrics data are indicative of at least two of:
remaining battery power of an endpoint device,
power consumption by an endpoint device,
connectivity performance to the second network for an endpoint device,
charges for an endpoint device to access the second network, or
remaining data available on a data plan for an endpoint device.

13. The system of claim 4, wherein selecting the network access device comprises causing the system to:
execute an algorithm stored on the non-transitory memory to optimize a global performance metric used to decide which of the multiple endpoint devices will serve as the network access device,
wherein the global performance metric is optimized to:
reduce charges of one or more service plans,
reduce power consumption of available power sources,
improve connectivity performance to the second network, or
increase an amount of time for the multiple endpoint devices to remain connected to the second network.

14. The system of claim 4, wherein the manager devices processes the performance metrics data causing the system to:
jointly evaluate performance of the multiple endpoint devices to optimize usage of a resource across all the multiple endpoint devices,
wherein the resource includes one or more of: network connectivity, a total power sources, or total charges.

15. The system of claim 4 further caused to:
select an edge device of the first network as the network access device for the multiple endpoint devices,
wherein the manager device selects the edge device based on additional performance metrics data; and
route network traffic of the multiple endpoint devices to the second network through the edge device instead of the second endpoint device.

16. A method comprising:
establishing consensus among multiple network nodes to share performance metrics data among the multiple network nodes that form a first network,
wherein the multiple network nodes include multiple endpoint nodes, and
wherein each of the multiple network nodes is operable to independently connect to a second network different from the first network;
selecting a first network node of the multiple network nodes as a manager node, wherein the manager node is configured to select a network access node through which network traffic is communicated between the multiple network nodes and the second network;

selecting a second network node of the multiple network nodes as the network access device, wherein the second network node is selected based on the performance metrics data to optimize a global performance metric of the first network; and routing the network traffic between the multiple network nodes and the second network through the second network node.

17. The method of claim 16, wherein to optimize a global performance metric comprises:

reducing charges for the network nodes to access the second network, reducing battery power consumption of the network nodes, or improving connectivity performance of the network nodes.

18. The method of claim 16 further comprising:

selecting an edge node of the network nodes as the network access node; and routing all network traffic of the multiple network nodes for the second network through the edge node instead of the first network node.

19. The method of claim 16 further comprising:

changing the manager node to a third network node base on additional metrics data; and enabling the third network node to change the network access node based on the additional metric data.

20. The method of claim 16, wherein the consensus to share the performance metrics data among the multiple network nodes is only among network devices that have a common owner, are managed by a common entity, or share a common service plan.

\* \* \* \* \*